(12) United States Patent
Prummel (10) Patent No.: US 9,473,156 B2
(45) Date of Patent: Oct. 18, 2016

(54) FAST SETTLING PHASE LOCKED LOOP (PLL) WITH OPTIMUM SPUR REDUCTION

(71) Applicant: Dialog Semiconductor B.V., 's-Hertogenbosch (NL)

(72) Inventor: Jan Prummel, Eindhoven (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 75 days.

(21) Appl. No.: 14/258,571

(22) Filed: Apr. 22, 2014

(65) Prior Publication Data

US 2015/0288371 A1    Oct. 8, 2015

(30) Foreign Application Priority Data

Apr. 8, 2014  (EP) ..................................... 14368019

(51) Int. Cl.
| | |
|---|---|
| H03L 7/06 | (2006.01) |
| H03L 7/107 | (2006.01) |
| H03L 7/093 | (2006.01) |
| G06F 17/50 | (2006.01) |
| H03L 7/10 | (2006.01) |

(52) U.S. Cl.
CPC ......... *H03L 7/1075* (2013.01); *G06F 17/5045* (2013.01); *H03L 7/093* (2013.01); *H03L 7/10* (2013.01); *H03L 7/1077* (2013.01); *G06F 2217/02* (2013.01); *G06F 2217/08* (2013.01);
(Continued)

(58) Field of Classification Search
CPC ..................................................... H03L 7/1075
USPC ......................................................... 327/159
See application file for complete search history.

(56) References Cited

U.S. PATENT DOCUMENTS

| | | | | |
|---|---|---|---|---|
| 5,414,741 A | * | 5/1995 | Johnson ................. | H03D 3/245 331/18 |
| 5,977,838 A | * | 11/1999 | Nagoya ................... | H03L 7/183 327/157 |

(Continued)

FOREIGN PATENT DOCUMENTS

| | | |
|---|---|---|
| EP | 1890382 | 2/2008 |
| EP | 1 950 886 | 7/2008 |

(Continued)

OTHER PUBLICATIONS

European Search Report 14368019.7-1805 Mailed: Oct. 14, 2014.
(Continued)

*Primary Examiner* — Ryan Jager
(74) *Attorney, Agent, or Firm* — Saile Ackerman LLC; Stephen B. Ackerman; Billy Knowles (57) ABSTRACT

A method for constructing a phase locked loop begins with determining spurious frequency component criteria permitted within the PLL. A PLL filter prototype is selected with a desired settling time. A transfer function is generated based on the PLL transfer function that predicts the spurious components. A maximum level of the spurious components produced in the PLL is determined based on the maximum frequency step. If the maximum level of the spurious frequency components produced is too large, the order variable is incremented and the PLL transfer function is determined until the transfer function produces the spurious frequency components that meet the requirements. The components for a loop filter are selected based on the selected PLL transfer function. The adjustable frequency source tuning gain, the phase detector gain, the loop filter gain, and the divide factor are chosen to meet the requirements of the PLL transfer function.

28 Claims, 4 Drawing Sheets

(52) U.S. Cl.
CPC ....... *G06F 2217/82* (2013.01); *G06F 2217/84* (2013.01)

(56) References Cited

U.S. PATENT DOCUMENTS

| | | | | |
|---|---|---|---|---|
| 6,441,682 | B1* | 8/2002 | Vinn | H03H 11/0422 327/379 |
| 2007/0237273 | A1* | 10/2007 | Tan | H03H 11/1291 375/350 |
| 2007/0286273 | A1* | 12/2007 | Clara | H03F 3/217 375/238 |
| 2012/0154003 | A1* | 6/2012 | Gao | H03L 7/07 327/159 |

FOREIGN PATENT DOCUMENTS

| | | |
|---|---|---|
| EP | 1 890 382 | 3/2009 |
| WO | WO 00/46927 | 8/2000 |

OTHER PUBLICATIONS

"A Spur-Frequency-Boosting PLL with a -74dBc Reference-Spur Rejection in 90nm Digital CMOS," by Mohamed Elsayed et al., 2011 IEEE, Radio Frequency Integrated Circuits Symposium (RFIC), Jun. 5, 2011, 4 pgs.

* cited by examiner

FAST SETTLING PHASE LOCKED LOOP (PLL) WITH OPTIMUM SPUR REDUCTION

BACKGROUND

1. Field

This disclosure relates generally to design and construction of phase locked loop circuits. More particularly, this disclosure relates to the design and construction of phase locked loop circuits that optimize spurious harmonic frequencies usually caused by non-idealities within the components of the phase locked loop circuits.

2. Description of Related Art

Phase locked loops are used for a variety of clocking and synchronizing purposes as is known to those skilled in the art. In all cases, a compromise must be found between the speed in which phase lock is acquired (settling time) and the spectral purity of the output signal. As an example, a phase locked loop is used for frequency synthesis of a local oscillator signal in a receiver to synchronize the receiver with the incoming signal.

Figure 1:
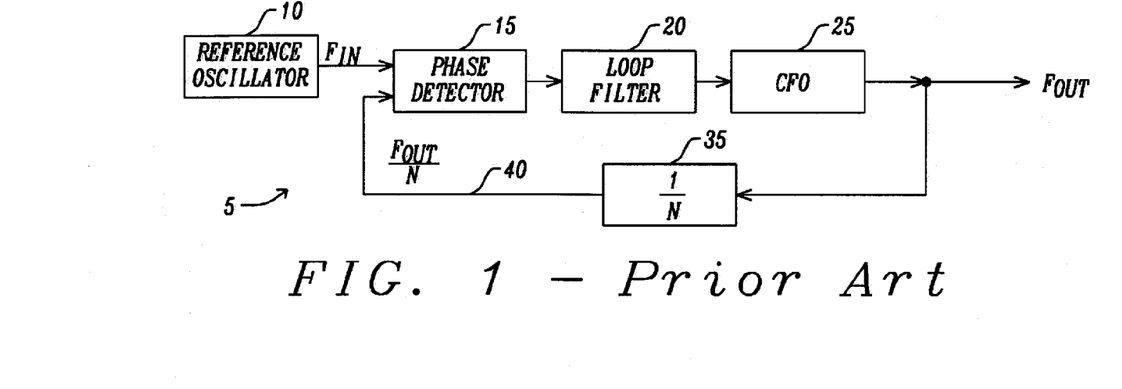
FIG. 1 is a block diagram of phase locked loop of the prior art.

FIG. 1 is a block diagram of phase locked loop of the prior art. Referring to FIG. 1, a phase-locked loop 5 has a stable reference oscillator 10 that provides the incoming reference signal $F_{IN}$ that is compared with the output signal $F_{OUT}$. The output $F_{IN}$ of the reference oscillator 10 is an input to a phase detector 15. The phase detector circuit 15 determines the phase error between the incoming reference signal $F_{IN}$ and the output signal $F_{OUT}$ and provides an output phase error voltage. The phase error is converted into a correction signal that is transferred to the loop filter 20. The loop filter 20 generates a control signal that varies the frequency of the adjustable frequency oscillator 25. The output of the adjustable frequency oscillator 25 is the output signal $F_{OUT}$. The output signal $F_{OUT}$ is fed to the optional feedback divider 35. The feedback divider 35 divides the output signal $F_{OUT}$ by a factor N to create the feedback signal 40 that is compared in the phase detector 15 to generate the correction signal. When the phase error has been reduced to zero, the adjustable frequency oscillator 25 is not varied and the phase-locked loop 5 is considered locked.

Current practice is to use the so-called type II phase locked loop architecture. This means that two integrators are present inside the loop, which causes the phase error signal to be controlled to be zero in steady state for input phase signals representing a step or a ramp. This phase error signal is usually represented by a pulse width modulated (PWM) square wave signal at the reference frequency. Any residual phase error will cause the tuning signal of the adjustable frequency oscillator to be modulated by a filtered representation of this pulse width modulated signal, visible as spurious components in the output spectrum at offset frequencies that are positive and negative multiples of the reference frequency. In steady state, the pulse width will be zero (or very near zero) and the control signal will have very limited energy at the harmonics of the reference frequency.

A type II PLL is very effective in suppression of the spurious components that are commonly referred to as reference spurs. The reference spurs are eliminated at their source (i.e. the steady state phase error) thanks to the two integrators in the loop. Unfortunately, this brings the control system on the brink of instability and the common remedy is to introduce a zero in the loop transfer function at an appropriate frequency such that the phase margin is sufficient for stable operation. This zero is also present in the closed loop transfer function, which causes overshoot in the step response. This has adverse effects on the settling time.

An application for a phase locked loop is as a frequency synthesizer within the transmitter/receiver for a Digital Enhanced Cordless Telecommunications (DECT) device. DECT is a digital communication standard that is primarily used in cordless telephone systems. DECT is used primarily in home and small office systems, but is also available in many PBX systems for medium and large businesses. DECT can also be used for purposes other than cordless phones such as baby monitors, remote controls for industrial applications. The DECT cordless telephone protocol uses a time division duplex (TDD), time division multiple access (TDMA), and/or a frequency division multiple access (FDMA) protocol. The system choices that were made at its inception have made it very difficult to use all the available time slots and all ten of the available frequencies. A fixed part splits up its time to transmit one time and receive one time per 10 ms to/from one or more portable transmitter/receiver devices. The 10 ms (representing 11,520 data symbol times) frame is divided in 24 slots (12 for transmit and 12 for receive). In principle, a single fixed transmitter/receiver device can be connected to 12 portable transmitter/receiver devices simultaneously. Each of the 480 symbol slots is divided into a payload of 424 symbols and a guard space of 56 symbols (roughly 48.6 µs). This guard space was meant to separate the transmissions of separate portable transmitter/receiver devices in time sufficiently to not interfere with each other. But it is generally too short for the synthesizer in the fixed transmitter/receiver device to tune to a new frequency. Originally the idea was that the fixed transmitter/receiver device would use one or more slots of blind spots to perform that tuning cycle. If the synthesizer cannot tune in less than 465 µs, two active slots must be sacrificed. However, if the synthesizer can be tuned in less than 465 µs, one of the active slots is now sacrificed. But that means that only the even or the odd slots can be used, reducing the number of portable transmitter/receiver devices that can connect to a single fixed transmitter/receiver device to six from twelve.

SUMMARY

An object to this disclosure is to provide a phase locked loop with sufficient spur reduction and fast settling time.

Another object of this disclosure is to provide a phase locked loop used within a time division multiplexing radio system such that all time slots within the system are usable eliminating blind-slots within the radio system.

To accomplish at least one of these objects, a phase locked loop circuit has a phase detector, a loop filter, and an adjustable frequency source. In some embodiments, the phase locked loop is a type I phase locked loop and the loop filter is a low pass filter. A method for the construction of the phase locked loop circuit begins with determining the criteria for spurious frequency components permitted within the phase locked loop circuit. An order variable is initialized and a filter prototype of the phased locked loop is selected with a desired settling time. A maximum level of the spurious components produced in the phase locked loop circuit having the selected filter prototype given a maximum frequency step is determined. If the maximum level of the spurious frequency components produced is too large, the order variable is incremented and the phase locked loop function is determined. This proceeds until the transfer function produces the spurious frequency components that meet the requirements. The components for a loop filter are selected based on the transfer function of the phase locked loop.

A phase detector gain, the loop filter gain, a divide ratio, and the tuning gain of the adjustable frequency source of the phase locked loop are chosen such that they obey the selected transfer function of the phase locked loop. The adjustable frequency source is a voltage controlled oscillator or any type of adjustable frequency source.

The filter prototype is of any family of all-pole prototype filter curves such as a Gaussian filter, a Butterworth filter, or a Chebyshev filter. The loop filter is an all pole filter with the number of poles being one less than the order of the phase locked loop. The phase locked loop has optimum settling time where the frequency or phase step is large compared to the required frequency tolerance. In various embodiments a Gaussian family of filters provides the filter prototype that meets the optimum solution. An optimum solution is found, when the required settling time is achieved, the spurious components are below a required level, and they are minimized relative to other filter prototypes.

In various embodiments, at least one of these objects is accomplished in a phase locked loop circuit that has spurious frequency components that meet specific criteria. The phase locked loop has a phase detector, a loop filter, and an adjustable frequency source. The phase locked loop is formed as an all pole filter with a selected prototype having a certain order with a desired settling time. The filter prototype is chosen to have maximum reduction of the spurious frequency components.

In determining the transfer function of the loop filter, a maximum frequency step, the phase detector gain, the loop filter gain factor, and the tuning gain of the adjustable frequency source of the phase locked loop are given. The adjustable frequency source is a voltage controlled oscillator or any type of adjustable frequency source.

The loop filter is an all pole filter with the number of poles being one less than the order of the phase locked loop.

In some embodiments, a time division or frequency division multiplexing radio system includes a frequency synthesizer for providing modulation or demodulation of frequency signals. The frequency synthesizer incorporates a phase locked loop circuit that has spurious frequency components that meet specific criteria. The phase locked loop has a phase detector, a loop filter, and an adjustable frequency source. The phase locked loop is formed as a filter with a selected prototype having an order of the order variable with a desired settling time. The filter prototype is a Gaussian filter, a Butterworth filter, a Chebyshev filter, or any other all pole filter.

The prototype of the phase locked loop circuit has a loop transfer function of the order variable that is generated using the phase detector gain, the loop filter gain factor, the tuning gain of an adjustable frequency source and the criteria for the spurious frequency components. In the construction of the phase locked loop, a maximum level of the spurious components produced in the phase locked loop circuit having the selected filter prototype is determined. If the maximum level of the spurious frequency components produced is too large, the order variable is incremented and the loop transfer function is determined. This proceeds until the phase locked loop circuit produces the spurious frequency components meet the requirements. The components for a loop filter are selected based on the phase locked loop circuit transfer function.

DETAILED DESCRIPTION

In DECT transmitter/receiver devices, the number of transmitter/receiver devices can be increased to the maximum number by eliminating the blind spots that result from the delay that is required for the fixed transmitter/receiver device to tune between frequencies. Increasing the tuning speed of the fixed transmitter/receiver device is accomplished by decreasing the settling time of the transfer function of the phase locked loop.

The phase locked loop is formed of a phase/frequency detector that determines the phase difference between an input reference frequency and submultiple of the output frequency. In some embodiments, the frequency of the input reference signal is approximately equal to the frequency of the generated output signal. The phase difference between the input reference signal and the output signal is the input to a loop filter. The output of the loop filter is the input to an adjustable frequency source such as a voltage controlled oscillator. A copy of the output signal is an input to a feedback divider that provides the submultiple signal that is compared to the reference signal.

The phase locked loops of the prior art are generally type-II phase locked loops in that there are two ideal integrators—one in the loop filter and the second in the voltage controlled oscillator. However, this forces the settling time and thus the tuning time of the voltage controlled oscillator to be too long. The phase locked loop of this disclosure is a type-I phase locked loop having only one integrator. The integrator in this case is the adjustable frequency source and the loop filter is a simple low pass filter. The design of the transfer function of the low pass filter is an ideal compromise between speed of the tuning cycle (settling time) and level of the reference spurs.

Figure 2:
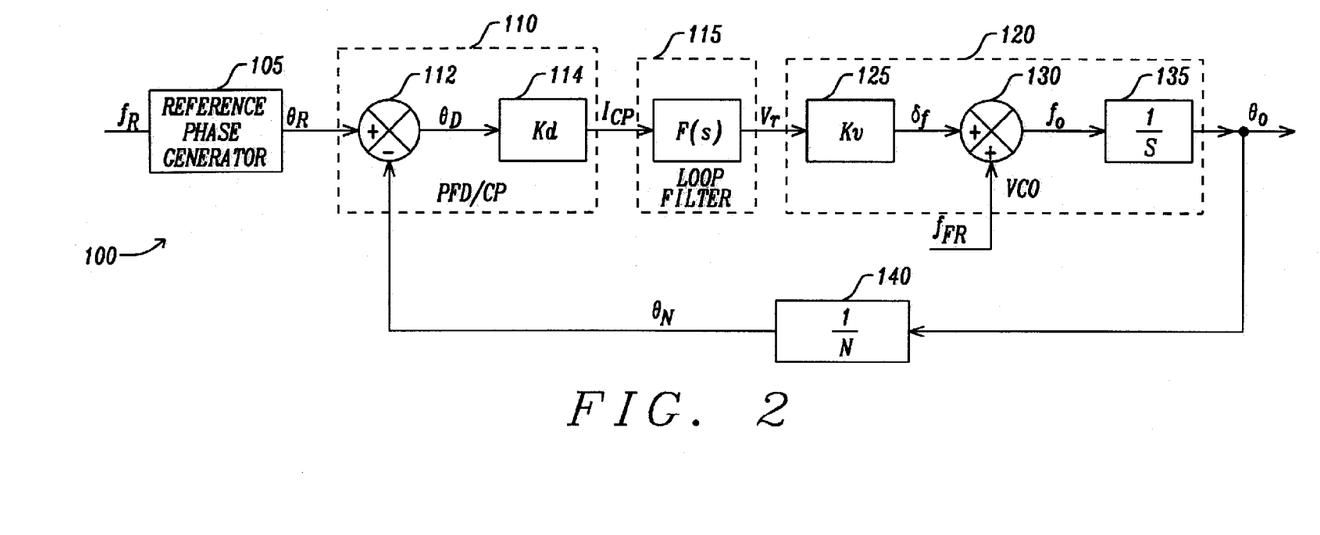
FIG. 2 is a block diagram of phase locked loop of this disclosure.

FIG. 2 is a block diagram of phase locked loop 100 of this disclosure. The reference signal generator 105 provides the reference phase signal $\theta_R$ as input to the phase detector 112 of the phase/frequency detector and charge pump 110 based on a reference frequency $f_R$. The phase difference signal $\theta_D$ of the phase detector 112 is the input to the charge pump 114. The gain of the charge pump 114 is denoted as Kd. The output signal $I_{CP}$ of the charge pump is a current that is the input of the loop filter 115. The transfer function of the loop filter 115 is denoted as F(s). The output of the loop filter 115 is a control signal $V_T$ that is the input to the voltage controlled oscillator 120. The tuning gain 125 of the voltage controlled oscillator 120 is denoted as Kv. The differential frequency $\delta f$ is applied to an adder circuit 130 to be integrated with the free running frequency $f_{FR}$ to form the output frequency $f_o$, that is applied to the frequency/phase output converter 135 and transferred as an output phase signal $\theta_o$. It should be noted that the adder circuit 130 is not a physical circuit but is drawn to imply superposition where a small deviation of the differential frequency Of from a stable initial condition of the free running frequency $f_{FR}$. Similarly, the frequency/phase output converter 135 is not a physical circuit. The output frequency $f_o$ is controlled, but the output phase signal $\theta_o$ is of interest. However, the output frequency $f_o$ and the output phase signal $\theta_o$ are fixed by nature. A copy of the output phase signal is applied to the feedback divider 140 where the output phase signal $\theta_o$ is divided by a factor N to form the divided output phase signal $\theta_N$. The divided output phase signal $\theta_N$ is the second input to the phase detector 112 that is combined with the reference signal $\theta_R$ to generate the phase difference (error) output signal $\theta_D$ of the phase detector 112.

The low pass filter characteristic of the closed loop transfer function translates to a loop filter 115 that is an all pole low pass filter. The order of the loop filter 115 is one less than the order selected for the closed loop transfer function of the phase locked loop 100. In the type-I PLL, the steady state duty cycle of the PWM signal representing the phase error $\theta_D$ is proportional to the initial frequency offset $f_{IOS}$. Where, the initial frequency offset $f_{IOS}$ is equal to the reference frequency $f_r$ multiplied by the factor N less the free running frequency ($f_{IOS}=N*f_R-f_{FR}$). In a practical system this initial frequency offset $f_{IOS}$ will be bounded and therefore the maximum spurious components are known. By selecting an appropriate filter order for the closed loop system of the phased locked loop 100, the selectivity provided by the loop filter 115 can always be made such that it suppresses the harmonics of the phase error signal $\theta_D$ to an acceptable level. In this way, the phase can be optimised for any settling time with a guaranteed amount of spur attenuation.

The closed loop transfer function (H(s)) for an $n^{th}$ order phase locked loop is given by the equation:

$$H(s) = \frac{\theta_O}{\theta_R} = \frac{N}{1 + \tau_N \cdot s \cdot d(s)} \quad \text{Eq. 1}$$

Where:
- $\theta_O$ is the phase angle of the output signal.
- $\theta_R$ is the phase angle of the reference signal.
- N is the divide factor of the output signal to the reference signal.

$$\tau_N = \frac{N}{KdKvR} \quad \text{Eq. 2}$$

Where:
- Kd is the gain of the charge pump 114.
- Kv is the tuning gain 125 of the voltage controlled oscillator 120.
- R is the loop filter gain.
- d(s) is the denominator polynomial of the loop filter transfer function F(s).
- s is the complex frequency variable.

The loop filter transfer function F(s) is generally of the transimpedance type where the input signal $I_{CP}$ is a current and the control signal $V_T$ is a voltage. The loop filter transfer function F(s) is determined by the equation $$F(s) = \frac{R}{d(s)} = \frac{R}{1 + \sum_{i=1}^{n-1} d_i \cdot s^i} \quad \text{Eq. 3}$$

Note that this system is not restricted to voltage controlled oscillators (VCOs). Any form of frequency control mechanism can be used to act as an adjustable frequency synthesizer in this phase locked loop 100. Further, this applies additionally to the gain Kd of the charge pump 114. Any detector gain is allowed and thus any quantity as the output of the phase/frequency detector and charge pump 110. In other embodiments, the output of the phase/frequency detector and charge pump 110 may not be the current $I_{CP}$, but may a voltage signal as an input to the loop filter 115. The loop filter 115 is an all-pole filter with n−1 poles that can be simple real and/or one or more pairs of complex conjugates. These poles are the solution to the denominator polynomial d(s).

A selected closed loop transfer function for the phase locked loop would be given as:

$$H(s) = \frac{N}{\prod_{i=1}^{n}(1+s\mu_i)} = \frac{N}{1 + \sum_{i=1}^{n} m_i \cdot s^i} = \frac{N}{1 + s \cdot \sum_{i=1}^{n} \mu_i + \ldots + s^n \cdot \prod_{i=1}^{n} \mu_i} \quad \text{Eq. 4}$$

Where:
$\mu_i$ are the n time constants corresponding to the solution of the characteristic polynomial with coefficients $m_i$.

Solving the above permits the time constant $\tau_N$ to be determined according to the equation:

$$\tau_N = \frac{N}{KdKvR} = m_1 = \sum_{i=1}^{n} \mu_i \quad \text{Eq. 5}$$

The constant parameters Kd, Kv and/or R of the functions of the phase locked loop 100 can thus be tuned to their desired value. If the variation of the divide factor N is too large to be considered as a constant, one of Kd, Kv or R can be made dependent on the divide ratio as described in European patent EP 1 890 382 B1, issued Mar. 4, 2009 and incorporated herein by reference in its entirety.

The remaining coefficients $m_i$ that determine the selected transfer function are scaled with time constant $\tau_N$ to find the polynomial d(s), thus determining the loop filter transfer function. The polynomial d(s) is determined by the equation:

$$d(s) = \prod_{i=1}^{n-1}(1+s\tau_i) = 1 + \sum_{i=1}^{n-1} d_i \cdot s^i = 1 + \sum_{i=1}^{n-1} \frac{m_{i+1}}{m_1} \cdot s^i \quad \text{Eq. 6}$$

The coefficients of the loop filter 115 are thus defined solely by the selected closed loop transfer function according to the equation:

$$d_i = \frac{m_{i+1}}{m_1}. \quad \text{Eq. 7}$$

This makes the transfer function G(s) of the frequency modulation δf due to of the phase error $\theta_D$ also fixed with the choice of H(s) according to the equation:

$$G(s) = \frac{\delta f}{\theta_D} = \frac{KdKvR}{d(s)} = \frac{KdKvR}{1 + \sum_{i=1}^{n-1} \frac{m_{i+1}}{m_1} \cdot s^i} \quad \text{Eq. 8}$$

The constant forward gain $$KdKvR = \frac{N}{m_1}$$

determines the frequency step that corresponds to any value of phase error $\theta_D$. With the phase expressed in cycles the value of phase error $\theta_D$ corresponds with the duty cycle of the pulse width modulated control signal $I_{CP}$. From the initial frequency offset $f_{IOS}$ the steady state phase error $\theta_{D,SS}$ is determined by the equation:

$$\theta_{D,ss} = \frac{f_{IOS}}{KdKvR} \quad \text{Eq. 9}$$

The Fourier series of a pulse width modulated square wave of the control signal $I_{CP}$ that has a duty cycle of the steady state phase error $\theta_{D,SS}$ is given by the equation:

$$c_k = \theta_{D,ss} \cdot \frac{\sin(k\pi\theta_{D,ss})}{k\pi\theta_{D,ss}} \cdot \exp(-jk\pi\theta_{D,ss}) \quad \text{Eq. 10}$$

These moduli of the coefficients for k>0 are all smaller than the steady state phase error $\theta_{D,SS}$ and are governed by the sinc function.

When the transfer function G(s) acts on the control signal $c_k$ it leads to a frequency modulation of the phase locked loop output signal that can be converted to spurious power by applying frequency modulation theory.

The above makes it clear that given a selected closed loop transfer function of Eq. 1, the level of the spurious components are only depending on the coefficients of the chosen closed loop transfer function and the initial frequency offset $f_{IOS}$. Any given combination of a maximum spurious level and settling time specification can be met and will lead to a minimum required order n for the phase locked loop.

Figure 3:
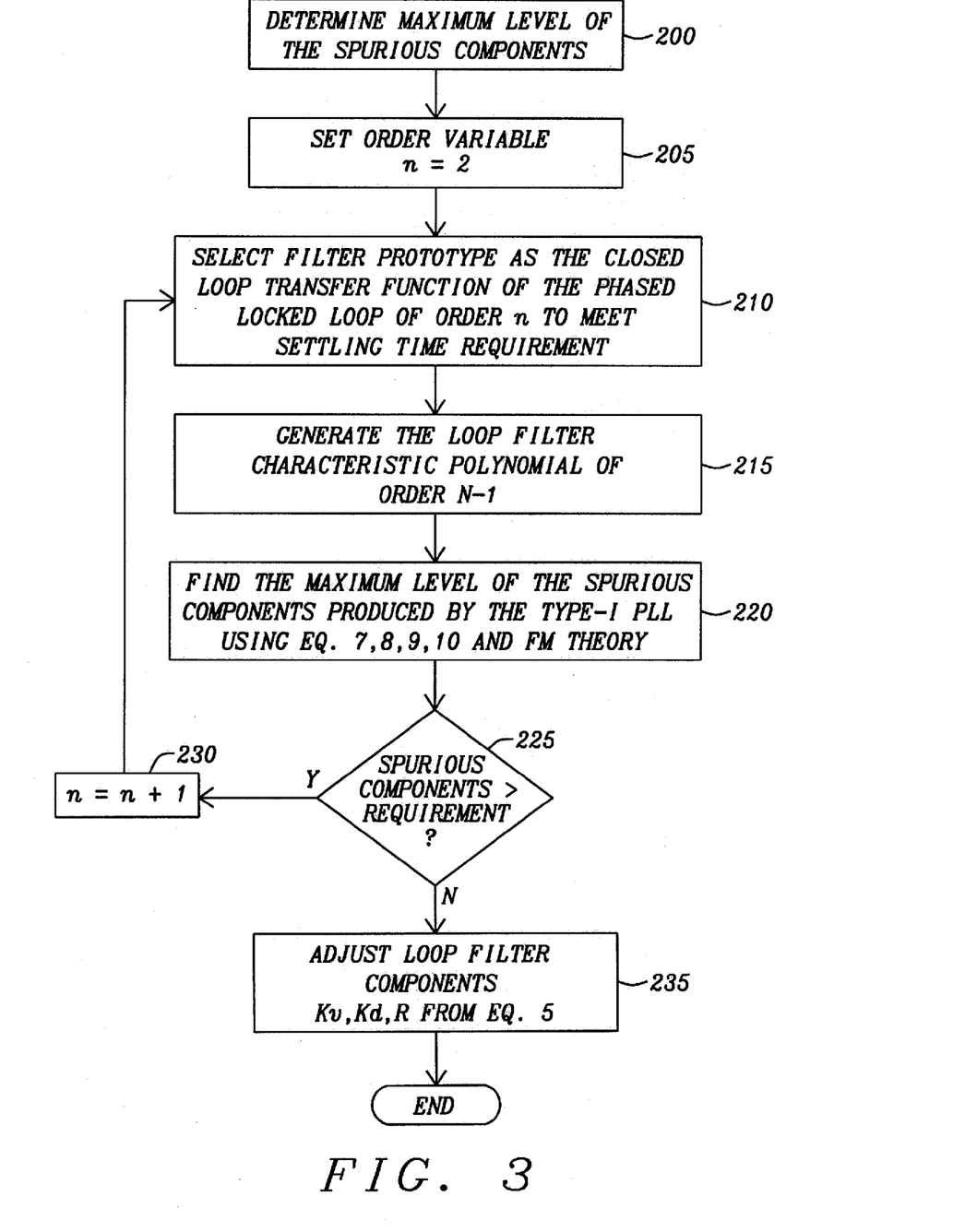
FIG. 3 is a flow chart of a method for designing the phase locked loop circuit of the present disclosure.
Figure 4:
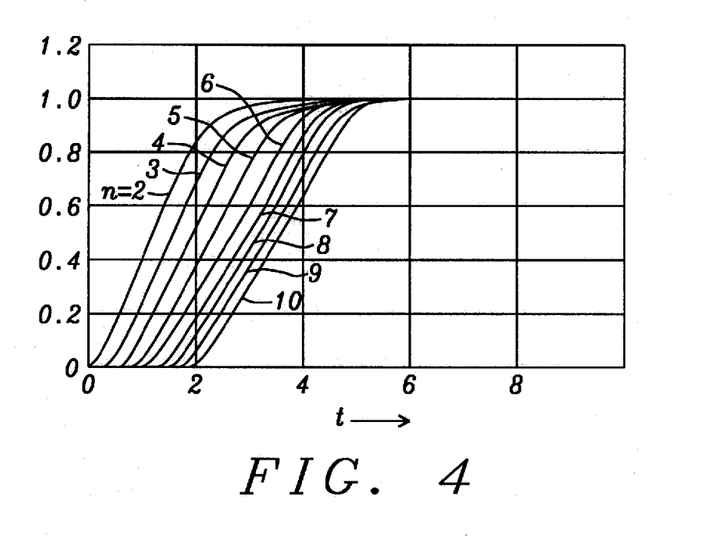
FIG. 4 is a plot of step responses of maximally flat delay (Bessel) filters.

As noted above, the design of the closed loop transfer function of the phase locked loop as a low pass filter is an ideal compromise between speed of the tuning cycle (settling time) and level of the reference spurs. Eq. 1 provides the closed loop function for a phase locked loop of FIG. 2. FIG. 3 is a flow chart of a method for designing the phase locked loop circuit 100. The method for the construction of the phase locked loop circuit begins with determining (Box 200) the criteria for spurious frequency components permitted within the phase locked loop circuit. An order variable n is initialized (Box 205) and a filter prototype of the phase locked loop of an order n is selected (Box 210) and frequency scaled to a desired settling time. FIG. 4 is a plot of step responses of maximally flat delay (Bessel) filters. As an example, the proposed filter prototype is chosen to be a Bessel function of order n. The plot of the chosen value of n of FIG. 4 is examined and the time at which the settling requirement is reached is noted as the time t(0). The settling time is different for varying orders and settling criteria. The prototype filter is then scaled such that the time t(0) becomes equal to the required settling time. The loop filter transfer function is generated (Box 215) as shown above for Eqs. 3-7 and is combined with the other system parameters (Kv, Kd, N) to realize the transfer function as found in Eq. 1.

The functions in Eq. 8, 9, and 10 combined with frequency modulation theory are used to determine (Box 220) maximum level of the spurious frequency components produced by the selected loop filter in the type-I phase locked loop. The spurious frequency components are compared (Box 225) to the requirements. If the spurious frequency components are too large, the order variable n is incremented (Box 230) and the filter prototype of the order variable n is selected (Box 210) with the desired settling time. The loop filter transfer function is generated (Box 215) as shown above for Eqs. 3-7 and is combined with the other system parameters (Kv, Kd, N) to realize the transfer function as found in Eq. 1.

This proceeds until the phase locked loop system 100 produces spurious components that when compared (Box 225) with the requirements are not greater than the requirements. The components Kd, Kv or R for a phase locked loop components are selected (Box 235) based on the system transfer function.

The filter prototype of the loop filter is a Gaussian filter or any filter that has a step response that has no or a very small systematic overshoot. The loop filter is an all pole filter with the number of poles being one less than the order of the phase locked loop 100. The phase locked loop 100 has optimum settling time versus spur attenuation compromise where the frequency or phase step is large compared to the required accuracy.

Figure 5A:
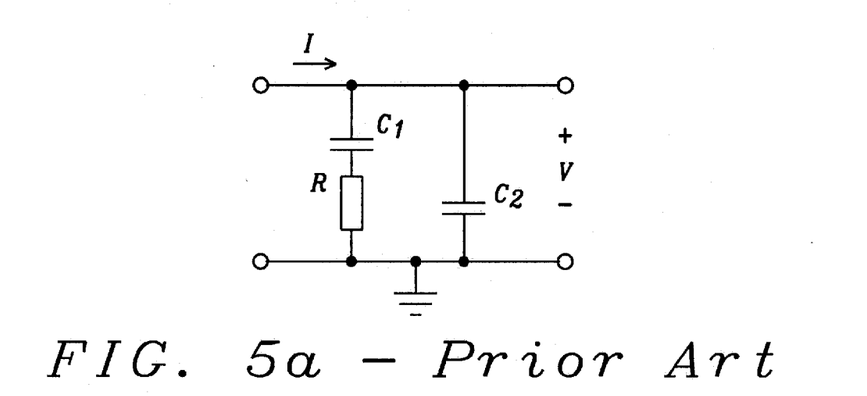
FIG. 5a is a schematic diagram of a passive loop of a third order type II phase locked loop of the prior art.
Figure 5B:
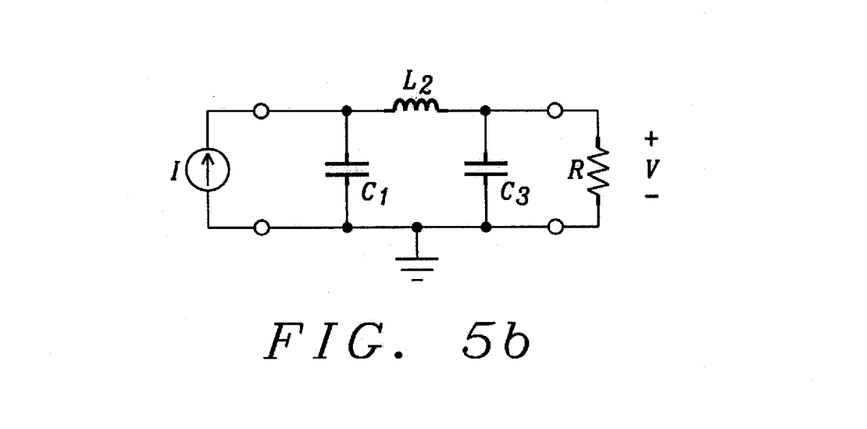
FIG. 5b is a schematic diagram of a passive filter prototype of the third order loop filter of the present disclosure.
Figure 5C:
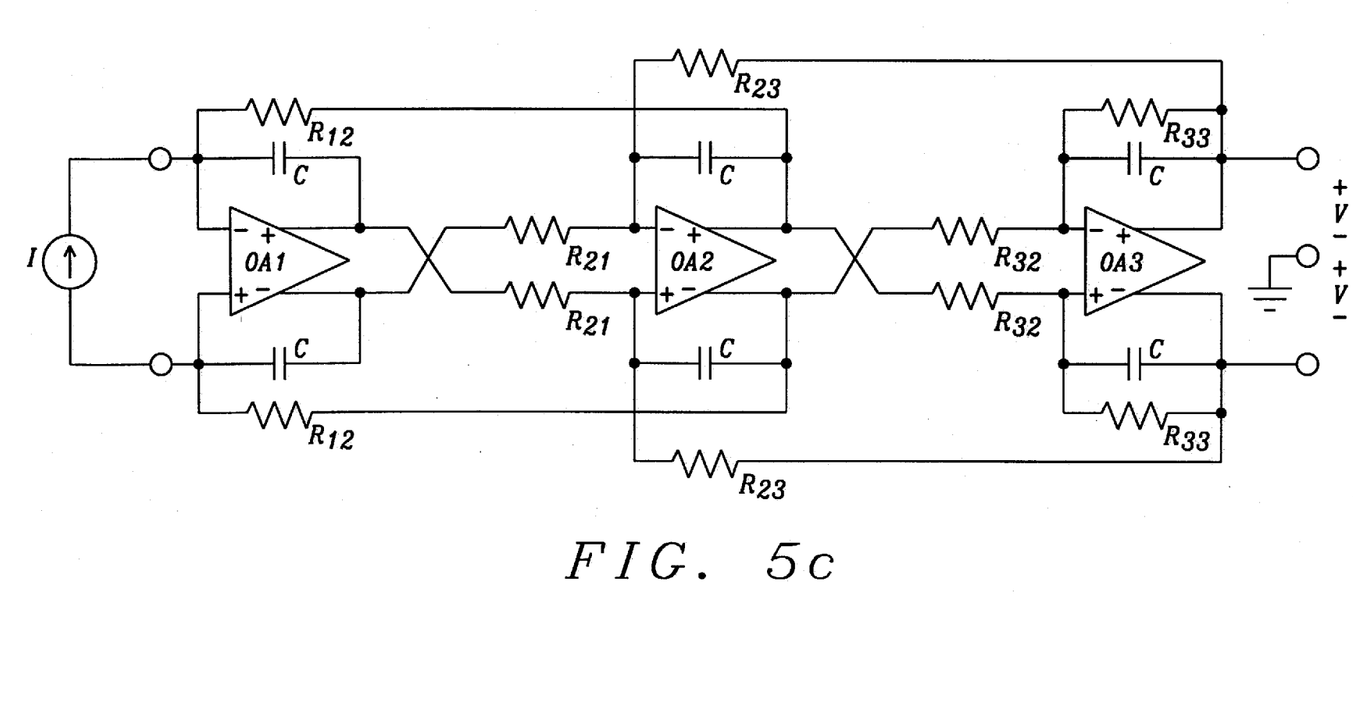
FIG. 5c is a schematic diagram of an active realization of a filter prototype of the third order loop filter of the present disclosure.

FIG. 5a is a schematic diagram of a passive loop filter of a third order type II phase locked loop 5 of the prior art. This structure introduces the zero to the closed loop transfer function that adversely affects the settling time of the phase locked loop. FIG. 5b is a schematic diagram of a passive filter prototype of the loop filter of the present disclosure showing a third order filter as an example. FIG. 5c is a schematic diagram of an active realization of a filter prototype of the loop filter of the present disclosure of FIG. 5c showing the third order filter as an example. The design of the filter prototype as shown leads to optimization of the spurious frequency components and settling time that will meet requirements, while providing a phase locked loop of minimum order n.

The method of FIG. 3 may be implemented as a program process that is retained on a storage device that is readable by a computer system. The computer system will extract the program process to determine the appropriate components of the phase locked loop to meet the requirements for the settling time and spurious frequency components.

While this disclosure has been particularly shown and described with reference to the preferred embodiments thereof, it will be understood by those skilled in the art that various changes in form and details may be made without departing from the spirit and scope of the disclosure.

What is claimed is:

1. A phase locked loop with optimum spur reduction of spurious frequency components and fast settling time comprising:

a phase detector receiving a reference phase signal and a submultiple phase signal and generating a phase difference signal as difference of the reference signal and the submultiple phase signal wherein the phase difference signal contains high frequency spurious frequencies in a steady state mode of operation;

a loop filter in communication with the phase detector to receive the phase difference signal and configured for filtering the spurious frequency components to required criteria and configured for generating the fast settling time for the phase difference signal to generate a frequency control signal with settling criterion to meet allowable offset of a phase locked loop output frequency;

an adjustable frequency source in communication with the loop filter to receive frequency control signal and generate an output phase signal; and a feedback divider in communication with the adjustable frequency source to the receive the output phase signal, divide an output phase signal frequency by a factor to generate the submultiple phase signal;

wherein the loop filter is based on a closed loop transfer function of the phase locked loop such that the transfer function has a filter prototype configured for meeting the fast settling time; and wherein the transfer function is determined by a gain of the phase detector, a gain of the loop filter, a tuning gain of the adjustable frequency source, criteria for the spurious frequency components, and a maximum frequency step;

wherein the closed loop transfer function of the phase locked loop is determined by the equation:

$$H(s) = \frac{N}{\prod_{i=1}^{n}(1+s\mu_i)} = \frac{N}{1+\sum_{i=1}^{n} m_i \cdot s^i} = \frac{N}{1+s\cdot\sum_{i=1}^{n}\mu_i + \ldots + s^n \cdot \prod_{i=1}^{n}\mu_i}$$

where:
N is a divide factor of the feedback divider,
s is a complex frequency variable,
$\mu_i$ is the time constants corresponding to polynomial coefficients $m_i$.

2. The phase locked loop of claim 1 wherein a transfer function of the loop filter is determined by the equation:

$$F(s) = \frac{R}{d(s)} = \frac{R}{1+\sum_{i=1}^{n-1} \frac{m_{i+1}}{m_1} \cdot s^i}$$

where:
n is the order of the closed loop transfer function of phase locked loop,
R is the loop filter gain.

3. The phase locked loop of claim 2 wherein the loop filter is an all pole filter with the number of poles being one less than the order of the phase locked loop.

4. The phase locked loop of claim 3 wherein the closed loop transfer function obeys the filter prototype of a Gaussian filter, a Butterworth filter, a Chebyshev filter, or any other all pole filter prototype.

5. The phase locked loop of claim 1 wherein the adjustable frequency source is a voltage controlled oscillator or any type of adjustable frequency source.

6. The phase locked loop of claim 1 wherein the phase detector has a current output, a voltage output, or any output signal receivable by the loop filter.

7. The phase locked loop of claim 1 wherein the loop filter transfer function is a transimpedance type corresponding to be compatible with the phase detector gain and the tuning gain of the adjustable frequency source.

8. A method for the construction of the phase locked loop circuit with optimum spur reduction of spurious frequency components comprising the steps of:

determining the criteria for spurious frequency components permitted within the phase locked loop circuit;

initializing an order variable;

selecting a filter prototype of the phase locked loop circuit having an order of the order variable that meets the fast settling time;

generating the level of the spurious components based upon the selected filter prototype, a maximum frequency step, and the criteria for the spurious frequency components;

determining a maximum level of the spurious components produced in phase locked loop circuit having the selected filter prototype;

determining if the maximum level of the spurious frequency components produced is too large and incrementing the order variable and the previous steps until the transfer function produces the spurious frequency components that meet the requirements;

calculating a loop filter transfer function corresponding to the selected phase locked loop circuit transfer function;

selecting a combination of a tuning gain of an adjustable frequency source, a phase detector gain, a loop filter gain, and a divide ratio to meet one requirement of the closed loop transfer function of the phase locked loop circuit, wherein the phase difference signal generated by the loop filter contains high frequency spurious frequencies in a steady state mode of operation;

selecting the components for the loop filter based on the transfer function that meets the fast settling time;

wherein the closed loop transfer function of the phase locked loop is determined by the equation:

$$H(s) = \frac{N}{\prod_{i=1}^{n}(1+s\mu_i)} = \frac{N}{1+\sum_{i=1}^{n} m_i \cdot s^i} = \frac{N}{1+s\cdot\sum_{i=1}^{n}\mu_i + \ldots + s^n \cdot \prod_{i=1}^{n}\mu_i}$$

where:
N is a divide factor of the feedback divider,
s is a complex frequency variable,
$\mu_i$ is the time constants corresponding to polynomial coefficients $m_i$.

9. The method of claim 8 wherein a transfer function of the loop filter is determined by the equation:

$$F(s) = \frac{R}{d(s)} = \frac{R}{1+\sum_{i=1}^{n-1} \frac{m_{i+1}}{m_1} \cdot s^i}$$

where:
n is the order of the closed loop transfer function of phase locked loop,
R is the loop filter gain.

10. The method of claim 9 wherein the loop filter is an all pole filter with the number of poles being one less than the order of the phase locked loop circuit.

11. The method of claim 10 wherein the filter prototype is a Gaussian filter, a Butterworth filter, a Chebyshev filter, or any other all pole filter.

12. The method of claim 8 wherein the adjustable frequency source is a voltage controlled oscillator or any type of adjustable frequency source.

13. The method of claim 8 wherein the phase detector has a current output, a voltage output, or any output signal receivable by the loop filter.

14. The method of claim 8 wherein the loop filter transfer function is a transimpedance type corresponding to be compatible with the phase detector gain and the tuning gain of the adjustable frequency source.

15. A non-transitory computer readable medium containing program code that is extracted and decoded by a computer system to implement a program process configured for designing a phase locked loop configured for meeting a fast settling time and reduction of spurious frequency components comprising the steps of:
- determining the criteria for spurious frequency components permitted within the phase locked loop circuit;
- initializing an order variable;
- selecting a filter prototype for the phase locked loop circuit having an order of one more than the order variable that meets the fast settling time based on a settling criterion given a maximum frequency step and attenuating harmonics of a reference frequency to a maximum amount;
- determining a maximum level of the spurious components produced in phase locked loop circuit having the selected filter prototype;
- determining if the order variable is incremented and if the maximum level of the spurious frequency components produced is too large until the transfer function produces the spurious frequency components that meet the requirements; and
- selecting the components for the loop filter based on the transfer function of the filter prototype for the phase locked loop, wherein the loop filter is configured for generating the phase difference signal that is allowed to contains high frequency spurious frequencies in a steady state mode of operation;
- wherein the closed loop transfer function of the phase locked loop is determined by the equation:

$$H(s) = \frac{N}{\prod_{i=1}^{n}(1+s\mu_i)} = \frac{N}{1+\sum_{i=1}^{n} m_i \cdot s^i} = \frac{N}{1+s\cdot\sum_{i=1}^{n}\mu_i + \ldots + s^n \cdot \prod_{i=1}^{n}\mu_i}$$

where:
N is a divide factor of the feedback divider,
s is a complex frequency variable,
$\mu_i$ is the time constants corresponding to polynomial coefficients $m_i$.

16. The non-transitory computer readable medium containing program code of claim 15 wherein a transfer function of the loop filter is determined by the equation:

$$F(s) = \frac{R}{d(s)} = \frac{R}{1+\sum_{i=1}^{n-1}\frac{m_{i+1}}{m_1}\cdot s^i}$$

where:
n is the order of the closed loop transfer function of phase locked loop,
R is the loop filter gain.

17. The non-transitory computer readable medium containing program code of claim 16 wherein the loop filter is an all pole filter with the number of poles being one less than the order of the phase locked loop circuit.

18. The non-transitory computer readable medium containing program code of claim 17 wherein the filter prototype is a Gaussian filter, a Butterworth filter, a Chebyshev filter, or any other all pole filter.

19. The non-transitory computer readable medium containing program code of claim 15 wherein the adjustable frequency source is a voltage controlled oscillator or any type of adjustable frequency source.

20. The non-transitory computer readable medium containing program code of claim 15 wherein the phase detector has a current output, a voltage output, or any output signal receivable by the loop filter.

21. The non-transitory computer readable medium containing program code of claim 15 wherein the loop filter transfer function is a transimpedance type corresponding to be compatible with the phase detector gain and the tuning gain of the adjustable frequency source.

22. A time division or frequency division multiplexing radio system comprising:
- a frequency synthesizer for providing modulation or demodulation frequency signals comprising:
  - a phase locked loop with optimum spur reduction of spurious frequency components and fast settling time comprising:
    - a phase detector receiving a reference phase signal and a submultiple phase signal and generating a phase difference signal as difference of the reference signal and the submultiple phase signal, wherein the phase difference signal contains high frequency spurious frequencies in a steady state mode of operation,
    - a loop filter in communication with the phase detector to receive the phase difference signal and configured for filtering spurious frequency components to a required criteria and configured for generating the fast settling time for the phase difference signal to generate a frequency control signal with settling criterion to meet allowable offset of a phase locked loop output frequency;
    - an adjustable frequency source in communication with the loop filter to receive the frequency control signal and generate an output phase signal; and
    - a feedback divider in communication with the adjustable frequency source to receive the output phase signal, divide an output phase signal frequency by a factor to generate the submultiple phase signal;
  - wherein the loop filter is based on a closed loop transfer function of the phase locked loop such that the transfer function has a filter prototype configured for meeting the fast settling time; and
  - wherein the transfer function is determined by a gain of the phase detector, a gain of the loop filter, a tuning gain of the adjustable frequency source, criteria for the spurious frequency components, and a maximum frequency step;
  - wherein the closed loop transfer function of the phase locked loop is determined by the equation:

$$H(s) = \frac{N}{\prod_{i=1}^{n}(1+s\mu_i)} = \frac{N}{1+\sum_{i=1}^{n} m_i \cdot s^i} = \frac{N}{1+s\cdot\sum_{i=1}^{n}\mu_i + \ldots + s^n \cdot \prod_{i=1}^{n}\mu_i}$$

where:

N is a divide factor of the feedback divider, s is a complex frequency variable, $\mu_i$ is the time constants corresponding to polynomial coefficients $m_i$.

23. The time division or frequency division multiplexing radio system of claim 22 wherein a transfer function of the loop filter is determined by the equation:

$$F(s) = \frac{R}{d(s)} = \frac{R}{1+\sum_{i=1}^{n-1}\frac{m_{i+1}}{m_1}\cdot s^i}$$

where:

n is the order of the closed loop transfer function of phase locked loop,

R is the loop filter gain.

24. The time division or frequency division multiplexing radio system of claim 23 wherein the loop filter is an all pole filter with the number of poles being one less than the order of the phase locked loop.

25. The time division or frequency division multiplexing radio system of claim 24 wherein the closed loop transfer function obeys the filter prototype of a Gaussian filter, a Butterworth filter, a Chebyshev filter, or any other all pole filter prototype.

26. The time division or frequency division multiplexing radio system of claim 22 wherein the adjustable frequency source is a voltage controlled oscillator or any type of adjustable frequency source.

27. The time division or frequency division multiplexing radio system of claim 22 wherein the phase detector has a current output, a voltage output, or any output signal receivable by the loop filter.

28. The time division or frequency division multiplexing radio system of claim 22 wherein the loop filter is a transimpedance type or a filter type corresponding to be compatible with the phase detector gain and the tuning gain of the adjustable frequency source.

* * * * *